(12) United States Patent
Yabe et al.

(10) Patent No.: US 8,250,623 B2
(45) Date of Patent: Aug. 21, 2012

(54) PREFERENCE EXTRACTING APPARATUS, PREFERENCE EXTRACTING METHOD AND PREFERENCE EXTRACTING PROGRAM

(75) Inventors: Toshiharu Yabe, Tokyo (JP); Tatsuya Narahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 11/983,002

(22) Filed: Nov. 6, 2007

(65) Prior Publication Data

US 2008/0109415 A1    May 8, 2008

(51) Int. Cl.
*H04N 7/16* (2011.01)
(52) U.S. Cl. .............. 725/151; 725/44; 725/45; 725/46; 725/131; 725/139; 707/734; 707/755; 709/203; 709/217; 709/218; 709/230; 715/204; 715/230; 715/254
(58) Field of Classification Search .................. None
See application file for complete search history.

(56) References Cited

U.S. PATENT DOCUMENTS

| | | | |
|---|---|---|---|
| 7,209,942 B1 * | 4/2007 | Hori et al. ..................... 709/203 |
| 2001/0039656 A1 * | 11/2001 | Nakamura et al. ................ 725/9 |
| 2003/0110490 A1 * | 6/2003 | Dew et al. ....................... 725/37 |
| 2005/0004930 A1 * | 1/2005 | Hatta ............................ 707/102 |
| 2006/0101504 A1 * | 5/2006 | Aravamudan et al. ......... 725/136 |
| 2006/0143647 A1 * | 6/2006 | Bill ................................. 725/10 |
| 2006/0236338 A1 * | 10/2006 | Shimoda ......................... 725/37 |
| 2007/0033634 A1 * | 2/2007 | Leurs et al. .................... 725/143 |
| 2007/0239447 A1 * | 10/2007 | Yamasaki et al. ............. 704/235 |
| 2008/0250452 A1 * | 10/2008 | Iwamoto ......................... 725/39 |

FOREIGN PATENT DOCUMENTS

| | | |
|---|---|---|
| JP | 2004 72502 | 3/2004 |
| JP | 2006 129122 | 5/2006 |
| WO | WO 00/40011 | 7/2000 |
| WO | WO 01 13553 | 2/2001 |

* cited by examiner

*Primary Examiner* — Jason Salce
*Assistant Examiner* — Chenea Smith
(74) *Attorney, Agent, or Firm* — Frommer Lawrence & Haug LLP; William S. Frommer

(57) ABSTRACT

A preference extracting apparatus includes a text information obtaining section that obtains text information having correspondence with a scene being currently played when video contents having text information having correspondence with each scene is played, a keyword extracting section that extracts a keyword for measuring user's preference based on the text information, a presenting section that presents the user a fact that the keyword has been extracted, a preference value defining section that defines a preference value of the user regarding the extracted keyword in accordance with the response by the user to the presentation, a storage section that establishes correspondence between the keyword and the preference value and stores them as the user's preference information in predetermined storage means.

13 Claims, 6 Drawing Sheets

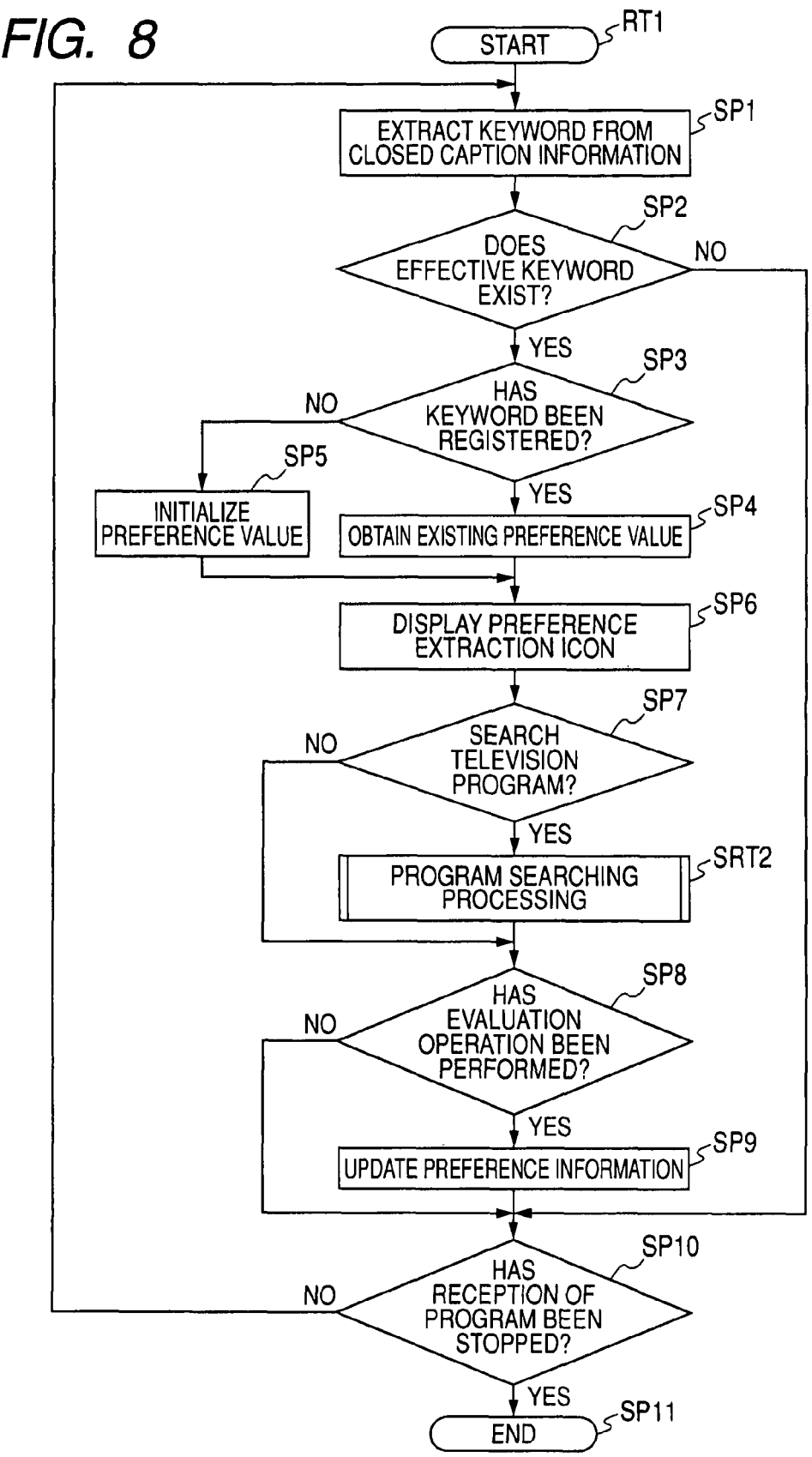

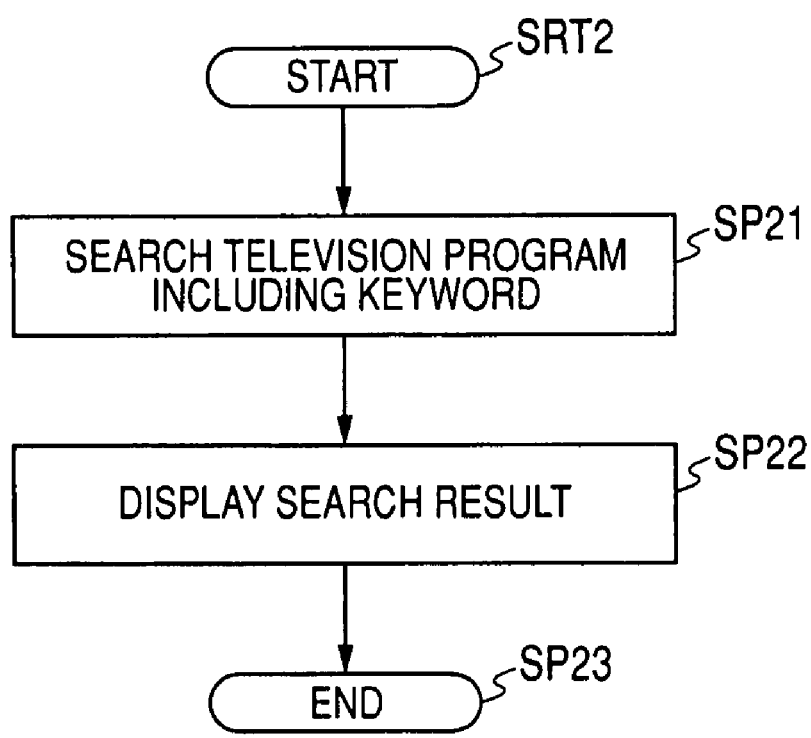

PREFERENCE EXTRACTING APPARATUS, PREFERENCE EXTRACTING METHOD AND PREFERENCE EXTRACTING PROGRAM

CROSS REFERENCES TO RELATED APPLICATIONS

The present invention contains subject matter related to Japanese Patent Applications JP 2006-303133 filed in the Japanese Patent Office on Nov. 8, 2006, the entire contents of which being incorporated herein by reference.

BACKGROUND OF THE INVENTION

1. Field of the Invention

The present invention relates to a preference extracting apparatus, a preference extracting method and a preference extracting program and is preferably applied to a program recording/playing apparatus that records and plays a broadcasted television program, for example.

2. Description of the Related Art

In the past, a program recording/playing apparatus has been widely spread that includes a recording medium such as a hard disk drive and records and plays a television program broadcasted through broadcast waves of a terrestrial digital broadcast, for example, in accordance with an operation by a user, for example.

Some program recording/playing apparatus may automatically record a television program matching with a predetermined keyword, for example, by using an EPG (Electronic Program Guide) that distributes program information such as the description and performers of a television program through broadcast waves.

Another program recording/playing apparatus has been proposed, for example, that internally has preference information describing information on user's preference and reflects the user's preference to the preference information in accordance with the operation history, for example, of the user, such as an operation of programming to record a television program or an operation of deleting a recorded program and then selects and records a television program matching with the user's preference based on the preference information (refer to, for example, JP-A-2004-072502 (FIG. 6) (US2005-0120371A1) (Patent Document 1))

SUMMARY OF THE INVENTION

By the way, one television program generally includes a combination of multiple scenes and corners. For this reason, a user may have thoughts including whether it is amazing or not or interesting or not, for example, on each scene or each corner.

However, in the program recording/playing apparatus, since preference information is updated in accordance with an operation in programs by a user, the thoughts, for example, that the user has on each scene or corner may not necessarily be reflected well thereto, which causes a problem that the precision for reflecting the user's preference to the preference information is reduced.

Accordingly, it is desirable to propose a preference extracting apparatus, preference extracting method and preference extracting program that can create preference information reflecting user's preference with high precision.

An embodiment of the present invention includes obtaining text information having correspondence with a scene being currently played when video contents having text information having correspondence with each scene is played, extracting a keyword for measuring user's preference based on the text information, presenting the user a fact that the keyword has been extracted, defining a preference value of the user regarding the extracted keyword in accordance with the response by the user to the presentation, establishing correspondence between the keyword and the preference value and storing them as the user's preference information in predetermined storage means.

Thus, preference information can be obtained including user's preference regarding one scene of video contents, which is expressed by user's preference value regarding a keyword extracted from the one scene based on user's response on the one scene.

According to embodiments of the invention, preference extracting apparatus, preference extracting method and preference extracting program that can obtain preference information including user's preference regarding one scene of video contents, which is expressed by user's preference value regarding a keyword extracted from the one scene based on user's response on the one scene and therefore can create preference information reflecting the user's preference with high precision.

BRIEF DESCRIPTION OF THE DRAWINGS

FIG. 8 is a flowchart showing reference information updating processing routine; and FIG. 9 is a flowchart showing a program searching processing subroutine.

DESCRIPTION OF THE PREFERRED EMBODIMENTS

With reference to drawings, embodiments of the invention will be described below.

[1] Configuration of Program Recording/Playing Apparatus

Figure 1:
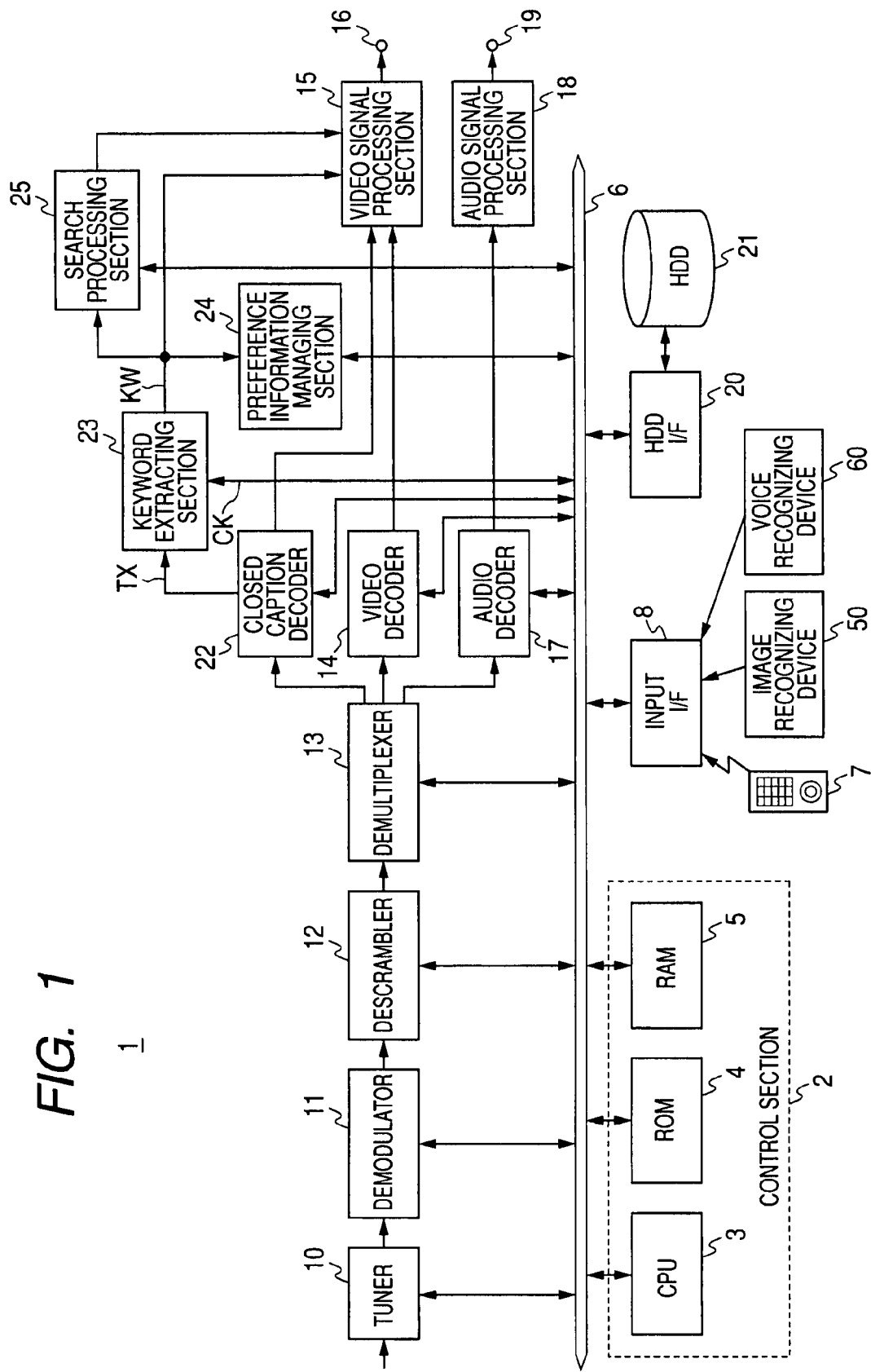
FIG. 1 is a block diagram showing a configuration of a program recording/playing apparatus.

In FIG. 1, a program recording/playing apparatus 1 receives and records a television program broadcasted by terrestrial digital television broadcasting, for example, in advance and plays the recorded television program, which allows a user to view and listen to the video images and voice through an external monitor apparatus (not shown).

The program recording/playing apparatus 1 is centrally controlled by the control section 2 as a whole. The control section 2 mainly includes a CPU (Central Processing Unit) 3 and can perform preference information updating processing and/or program searching processing by loading a program such as a basic program, a preference information updating program and a program searching program from a ROM (Read Only Memory) 4 connecting thereto via a system bus 6 and expanding and executing the program in a RAM (Random Access Memory) 5.

The program recording/playing apparatus 1 can receive an operation by a user through an operating section, not shown. In addition, in response to an operation on a remote controller 7 by a user, the infrared signal transmitted from the remote controller 7 is received through an infrared ray receiving section (not shown) of an input interface 8, is converted to a predetermined operation signal and is supplied to the control section 2 via the system bus 6. The control section 2 here is configured to perform the processing according to the operation signal.

For example, in a case where a user performs an operation of switching television broadcast stations to receive, that is, an operation of switching channels on the remote controller 7, the control section 2 instructs a tuner 10 the channels to be switched based on the operation signal supplied through the input interface 8.

The program recording/playing apparatus 1 here extracts, from the tuner 10, the frequency band corresponding to the channel instructed from the control section 2 from the digital broadcast signal received through an antenna, demodulates it by the next demodulator 11, descrambles it by a descrambler 12 and demultiplexes it by a demultiplexer 13 to a video data packet PV, voice data packet PA, EPG information packet PE and closed caption information packet PT and so on included in television programs at multiple channels.

The demultiplexer 13 supplies the video data packet PV, voice data packet PA and closed caption information packet PT of the instructed channel to a video decoder 14, a audio decoder 17 and a closed caption decoder 22, respectively, and transmits the EPG information packet PE of each channel to the control section 2 though the system bus 6.

The video decoder 14 generates a video signal SV by decoding the video data packet PV by MPEG (Motion Pictures Expert Group) 2-Video, for example, and supplies it to a video signal processing section 15.

The video signal processing section 15 generates an output video signal SVO by converting the video signal SV to NTSC format and performing mixing processing thereon and output the same to a monitor apparatus (not shown) connected to a video image output terminal 16. In response thereto, a monitor apparatus (not shown) displays the video images based on the output video signal SVO on a display panel (not shown).

On the other hand, the audio decoder 17 generates a digital audio signal DA by decoding the voice data packet PA by MPEG2-Audio, generates an analog audio signal SA by causing a audio signal processing section 18 to perform D/A (Digital/Analog) conversion and/or audio signal processing such as equalizing thereon and then outputs the analog audio signal SA to an amplifier (not shown) connecting to a voice output terminal. In response thereto, the amplifier (not shown) outputs the voice based on the audio signal SA through a speaker (not shown).

The control section 2 further extracts the EPG information such as the title of and date and time for the television program from the EPG information packet PE and stores the EPG information in an EPG database DBE (not shown) included within a hard disk drive (HDD) 21 by transmitting them to a hard disk drive interface (HDD I/F) 20.

By the way, in response to an instruction to record a television program currently being broadcasted from a user through the remote controller 7, the control section 2 supplies the packets such as the video data packet PV, voice data packet PA and closed caption information packet PT to the hard disk drive interface 20 via the system bus 6.

In response thereto, the hard disk drive interface 20 records the television program by creating a file with the television program name obtained from the EPG information packet PE and storing data such as video data extracted from the video data packet PV, voice data extracted from the voice data packet PA and closed caption information data extracted from the closed caption information packet PT sequentially into the file in the hard disk drive 21. The thus recorded television program is called recorded program, hereinafter.

The control section 2 creates a management database for managing recorded programs stored in the hard disk drive 21. For example, in response to the reception of an instruction by a user to display a list of recorded programs stored in the hard disk drive 21 through the remote controller 7, the control section 2 may create a list display screen of recorded programs by loading the contents of the management database and supplies them to the video signal processing section 15 and causes a monitor apparatus (not shown) to display it.

Here, the control section 2 starts playing a recorded program if the recorded program on the list display screen is selected. In other words, the control section 2 loads the video data from the file of the recorded program recorded in the hard disk drive 21 and supplies it to the video decoder 14 and loads voice data thereof and supplies it to the audio decoder 17.

After that, the control section 2, like the operation in response to the reception of the instruction for the television program being currently played, generates an output video signal SVO through the video decoder 14 and video signal processing section 15 and supplies it to a monitor apparatus and generates an audio signal SA through the audio decoder 17 and audio signal processing section 18 and supplies it to an amplifier. Thus, the recorded program can be played, and the user can view the program.

By the way, in response to the reception of an instruction to display closed caption through the remote controller 7 during the reception of a television broadcast or the playback of a recorded program, the control section 2 causes the closed caption decoder 22 to extract closed caption information TX from the closed caption information packet PT or closed caption information data and supplies it to the video signal processing section 15 and a keyword extracting section 23.

In this case, the video signal processing section 15 generates an output video signal SVO by playing the closed caption screen based on the closed caption information TX over the video image represented by the video signal SV and supplies it to a monitor apparatus. Thus, the control section 2 can allow a user to view the video image having the text based on the closed caption information TX thereover.

In this way, the program recording/playing apparatus 1 receives a television program being currently broadcasted and allows a user to view the television program through an external monitor apparatus. The program recording/playing apparatus 1 further creates the "recorded program" by recording the television program in the hard disk drive 21 and can load and play the recoded program from the hard disk drive 21.

[2] Updating Preference Information By Keyword

A user may use the program recording/playing apparatus 1 simply as a receiving apparatus for television broadcasting and may view parts of television programs by switching channels without determining a television program that the user desires to view in particular.

Figure 2A:
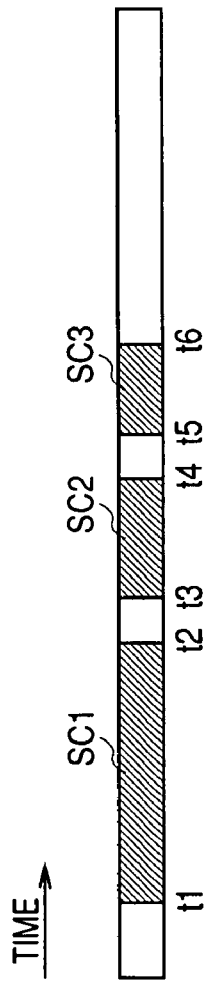
FIGS. 2A and 2B are schematic diagrams showing relationships between viewing durations and user's preference.

FIG. 2A shows the durations in a time axis that a user has actually viewed (which will be called viewing duration SC) among television programs broadcasted at channels. FIG. 2A shows that a user actually viewed the television programs of the viewing duration SC1 from the time t1 to time t2, the viewing duration SC2 from the time t3 to time t4 and the viewing duration SC3 from the time t5 to time t6.

The user in this case may not have same expressions and thoughts on one television program and may possibly have different impressions and thoughts on the viewing durations SC, which are parts of one same television program.

Figure 2B:
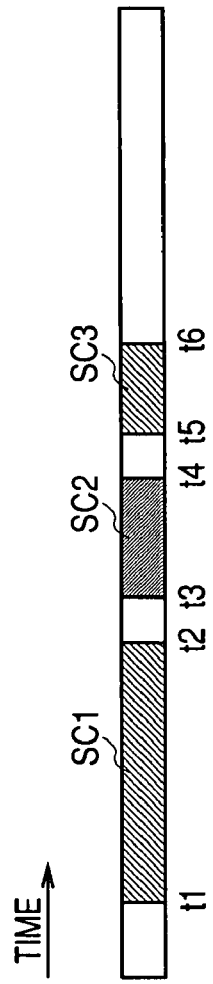

For example, as shown in FIG. 2B corresponding to FIG. 2A, a user may be interested in and have positive impressions and thoughts on the parts at the viewing durations SC1 and SC3 but may not be interested in and have negative impressions and thoughts on the part at the viewing duration SC2.

Accordingly, the program recording/playing apparatus 1 checks user's preference in consideration of the possibility that a user may have different impressions and thoughts on each scene even in one program.

[2-1] Extracting Keyword

The program recording/playing apparatus 1 is configured to extract a keyword KW from a television program being currently broadcasted. More specifically, during the reception of the television program being currently broadcasted, the program recording/playing apparatus 1 is configured to create closed caption information TX through the closed caption decoder 22 and extract a keyword KW included in the closed caption information TX through the keyword extracting section 23.

Here, the term, "keyword KW" is a string that is a subject of the check for user's preference and may be a noun such as "soccer", "cooking" and "travel" or a proper noun such as the name of a place and the name of a person, for example.

Figure 3:
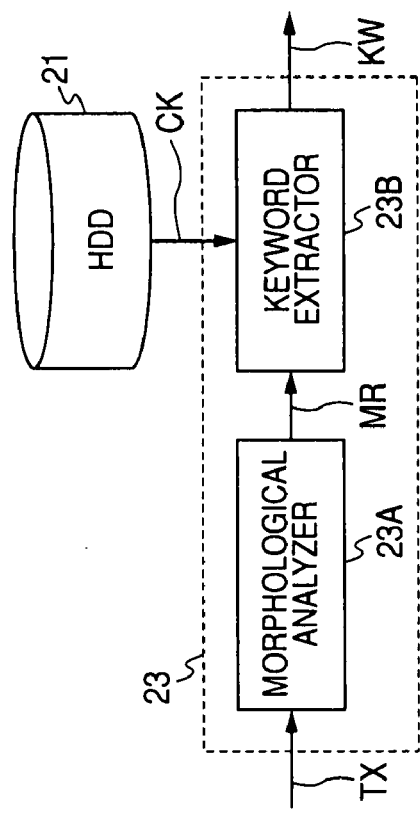
FIG. 3 is a block diagram showing a configuration of a keyword extracting section.

The keyword extracting section 23 includes a morphological analyzer 23A and a keyword extractor 23B as shown in FIG. 3.

The morphological analyzer 23A performs morphological analysis processing on closed caption information TX including serial strings. Thus, the morphological analyzer 23A divides the closed caption information TX into shorter strings called morpheme MR, and each morpheme MR is sequentially supplied to the subsequent keyword extractor 23B. Notably, a morpheme MR is a meaningful string in a minimum unit as a language and may be generally used for distinguishing the part of speech.

On the other hand, the hard disk drive 21 stores a criterion, as a keyword criterion CK, for selecting a morpheme MR, as a keyword KW, suitable for measuring user's preference among divided morphemes MR.

The keyword extractor 23B loads the keyword criterion CK from the hard disk drive 21, selects, as a keyword KW, the one matching with the keyword criterion among the morphemes MR sequentially supplied from the morphological analyzer 23A and supplies it to the video signal processing section 15, preference information managing section 24 and search processing section 25.

In this way, the keyword extracting section 23 divides closed caption information TX to morphemes MR and extracts, as a keyword KW, the one matching with the keyword criterion CK from the morphemes MR.

[2-2] Updating Preference Information

Figure 4:
FIG. 4 is a schematic diagram for describing the display of a keyword extraction icon.

In response to the supply of the keyword KW from the keyword extracting section 23, the video signal processing section 15 generates an output video signal SVO having a keyword extraction icon IC in a predetermined form on a part (such as a lower right part) of the video image represented by a video signal SV. Thus, the program recording/playing apparatus 1 causes the keyword extraction icon IC to be displayed on a display screen P1 displayed on a monitor apparatus, as shown in FIG. 4, whereby the fact that the keyword KW has been detected is notified to a user.

On the other hand, a user is previously informed to perform evaluation by pressing either "Interested" button or "Not-interested" button on the remote controller 7 when the keyword extraction icon IC is displayed on the display screen P1.

The control section 2 of the program recording/playing apparatus 1 (FIG. 1) awaits the response from a user and, if the control section 2 recognizes that the "Interested" button has been pressed on the remote controller 7, for example, generates the positive evaluation signal SVP by determining that the positive valuation has been obtained and supplies it to the preference information managing section 24 via the system bus 6.

If the control section 2 recognizes that the "Not-Interested" button has been pressed on the remote controller 7 as the response by the user, the control section 2 generates the negative evaluation signal SVN by determining that the negative evaluation has been obtained and supplies it to the preference information managing section 24 via the system bus 6.

The user here evaluates based on the impressions and thoughts on the scene that he or she is viewing currently among the television program S.

By the way, the hard disk drive 21 includes a preference information database DBP having correspondence between a keyword KW and the preference value VP indicating the degree of preference on the keyword KW under the management of the preference information managing section 24. The preference value VP is configured to vary from a value 0 for a low degree of preference to a value 1 for a high degree of preference, for example. The initial value is a value 0.5.

In response to the supply of a keyword KW from the keyword extracting section 23, the preference information managing section 24 searches the keyword KW within the preference information database DBP first. If the keyword KW hits, the preference value VP corresponding to the keyword KW is loaded. If the keyword KW does not hit within the preference information database DBP, the preference information managing section 24 defines the initial value as the preference value VP corresponding to the keyword KW.

Next, in response to the acquisition of the positive evaluation signal SVP or negative evaluation signal SVN (both of which will be called evaluation signal SV) from the control section 2, the preference information managing section 24 increases/decreases the preference value VP corresponding to the keyword KW supplied from the keyword extracting section 23.

More specifically, in response to the acquisition of the positive evaluation signal SVP from the control section 2, the preference information managing section 24 adds a value 0.1 to the preference value VP of the keyword KW. In response to the acquisition of the negative evaluation signal SVN, the preference information managing section 24 subtracts a value 0.1 from the preference value VP.

Subsequently, the preference information managing section 24 establishes correspondence between the updated preference value VP and the keyword KW and stores it in the preference information database DBP, whereby the preference information database DBP is updated.

As a result, the preference information managing section 24 extracts the evaluation signal SV, which is the evaluation result on one scene of a television program being currently viewed by a user, from the scene of the television program, determines it as an indication of the preference on the keyword KW highly related to the scene and updates the preference value VP.

In other words, the preference information managing section 24 expresses the impressions and thoughts, for example, of a user on one scene of a television program by using the combination of the keyword KW and the preference value VP and stores and updates it in the preference information database DBP.

[2-3] Searching Television Program

In response to the reception of the instruction to search a television program from a user through the remote controller 7 during the display of the preference information icon IC, the program recording/playing apparatus 1 is configured to search a television program by using the keyword KW, which has been evaluated immediately before.

Figure 5:
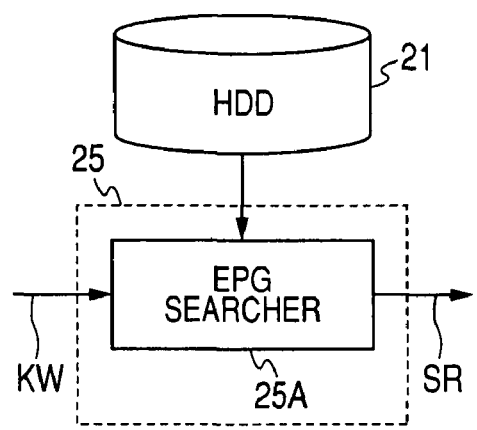
FIG. 5 is a block diagram showing a configuration of a search processing section.

The search processing section 25 has an EPG searcher 25A as shown in FIG. 5. In response to the supply of a keyword KW from the keyword extracting section 23 (FIG. 1), the EPG searcher 25A searches a television program including the keyword KW in the program name and/or description information among television programs to be broadcasted in the future from the EPG database DBE in the hard disk drive 21.

If a television program including the keyword KW hits, the search processing section 25 supplies the program name, for example, to the video signal processing section 15 as search result information SR. If no television program including the keyword KW hits, the search processing section 25 notifies the fact to the video signal processing section 15 as the search result information SR.

Figure 6:
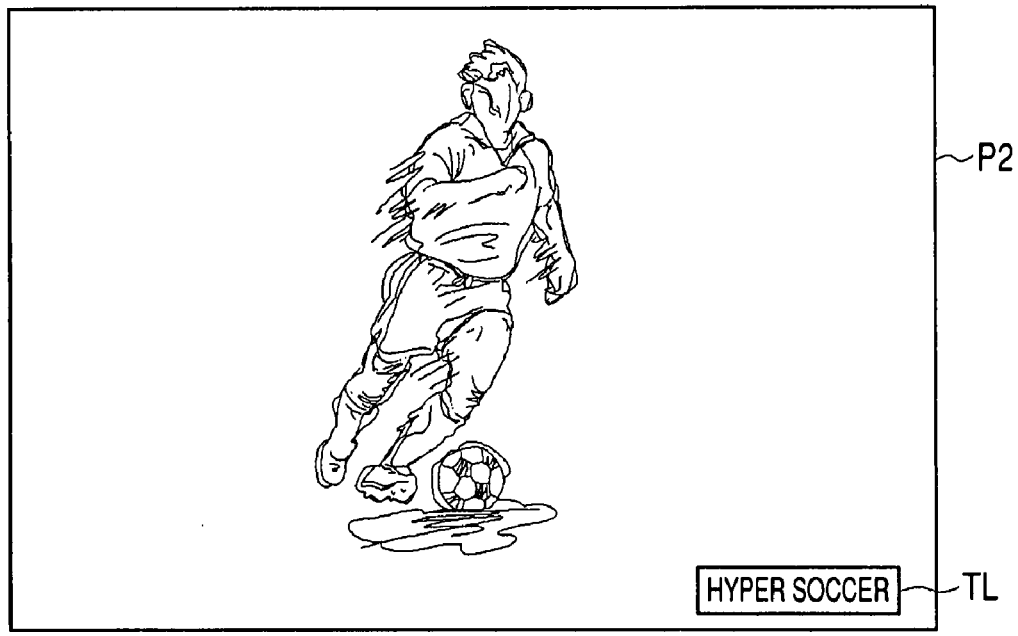
FIG. 6 is a schematic diagram for describing the display [1] of the name of a searched program.

In response thereto, the video signal processing section 15 generates an output video signal SVO placing the program name of the television program obtained as the search result information SR in a part (such as lower right part) of the video image represented by a video signal SV. Thus, the program recording/playing apparatus 1 causes the program name string TL to be displayed on a display screen P2 displayed on a monitor apparatus, as shown in FIG. 6, whereby the fact that the television program has been detected is notified to a user.

The program recording/playing apparatus 1 here programs to record the television program described by the program name string TL in response to the reception of the instruction to program through the remote controller 7 by a user.

Notably, if no television program including a keyword KW does not hit, the program recording/playing apparatus 1 is configured to display the fact that no television program has hit instead of the program name string TL.

If multiple keywords KW are extracted, the program recording/playing apparatus 1 is configured to search a television program including the keywords KW. In this case, the program recording/playing apparatus 1 causes a special search result display screen P3 to be displayed on a monitor apparatus and display the search result on the keywords KW, as shown in FIG. 7, for example.

In response to the reception of the instruction to search a television program when the keyword extraction icon IC is not displayed, that is, when a keyword KW is not extracted by the keyword extracting section 23, the program recording/playing apparatus 1 is configured to select multiple keywords KW with larger preference values VP among keywords KW stored in the preference information database DBP through the preference information managing section 24 and search a television program through the search processing section 25.

Figure 7:
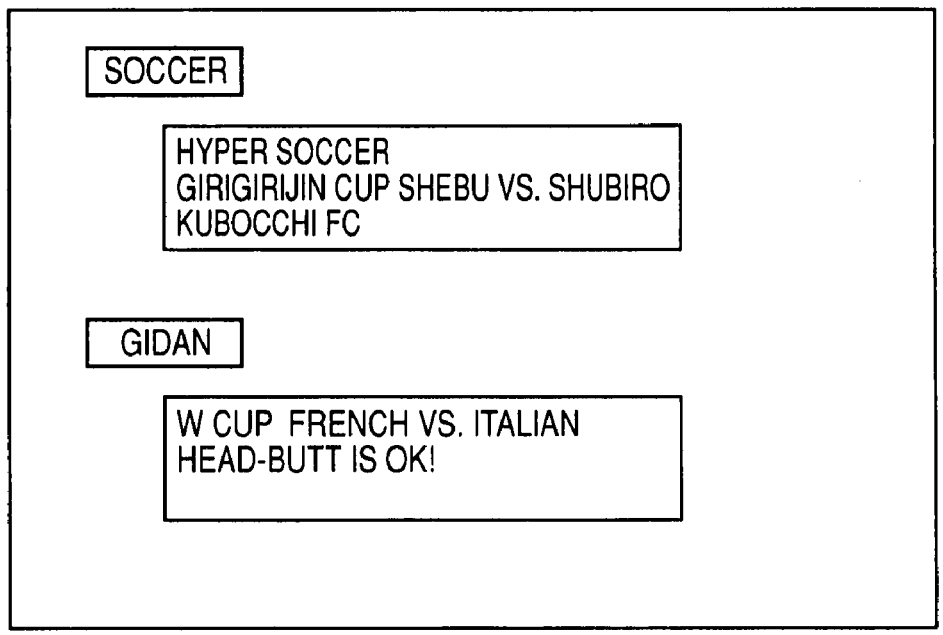
FIG. 7 is a schematic diagram for describing the display [2] of the name of a searched program.

In this case, the program recording/playing apparatus 1 is configured to cause the search result display screen P3 as shown in FIG. 7, for example, to be displayed on a monitor apparatus in order to display the search result on the keywords.

In this way, in response to an operation instruction by a user, the program recording/playing apparatus 1 is configured to search and present a television program including a keyword or select a keyword with a larger preference value VP and search and present a television program including the keyword KW.

[3] Processing Routine

Next, with reference to the flowcharts in FIGS. 8, 9 and 10, the processing of updating the preference information database DBP and processing of searching a television program by the program recording/playing apparatus 1 will be described.

[3-1] Preference Information Updating Processing

In reality, the control section 2 of the program recording/playing apparatus 1 starts a preference information updating processing routine RT1 shown in FIG. 8 when starting receiving a television program and moves to step SP1. In step SP1, the control section 2 causes the keyword extracting section 23 to extract a keyword KW from closed caption information TX and moves to the next step SP2.

In step SP2, the control section 2 determines whether the keyword KW matching with a keyword criterion CK, that is, an effective keyword KW has been extracted or not. If the negative result is obtained, the fact means that the preference information database DBP may not be updated based on a keyword KW. Then, the control section 2 moves to step SP10.

On the other hand, if the positive result is obtained in step SP2, the control section 2 moves to the next step SP3 to update the preference information database DBP based on the extracted keyword KW.

In step SP3, the control section 2 determines, through the preference information managing section 24, whether the newly extracted keyword KW has been already registered with the preference information database DBP or not, that is, whether the preference value VP has correspondence with the keyword KW or not. If the positive result is obtained here, the control section 2 moves to the next step SP4 to update the preference value VP.

In step SP4, the control section 2 loads the preference value VP having correspondence with the keyword KW through the preference information managing section 24 and moves to the next step SP6.

On the other hand, if the negative result is obtained in step SP4, first evaluation is to be performed on the keyword KW. Then, the processing moves to the next step SP5 where the initial value (that is, 0.5) is defined as the preference VP corresponding to the keyword KW and moves to the next step SP6.

In step SP6, the control section 2 causes the keyword extraction icon IC to be displayed on the display screen P1 (FIG. 4) through the video signal processing section 15 and moves to the next step SP7.

In step SP7, the control section 2 determines whether an operation instruction to search a television program has been received from a user or not, that is, whether the processing of searching a television program is to be performed or not. If the positive result is obtained, the control section 2 moves to the next subroutine SRT2 and performs the program searching processing (which will be described in detail later) and then moves to the next step SP8.

On the other hand, if the negative result is obtained in step SP7, the control section 2 moves to the next step SP8.

In step SP8, the control section 2 determines whether the evaluation operation has been performed by a user or not, that is, whether either "Interested" or "Not Interested" button has been pressed on the remote controller 7 or not. If the positive result is obtained, the control section 2 moves to the next step SP9.

In step SP9, the control section 2 supplies the positive evaluation signal SVP or negative evaluation signal SVN in accordance with the pressed "Interested" or "Not Interested" button to the preference information managing section 24. Thus, the preference information managing section 24 increases/decreases the preference value VP on the keyword KW and updates the preference information database DBP. Then, the control section 2 moves to the next step SP10.

On the other hand, if the negative result is obtained in step SP8, this means that the user has not performed the evaluation thereon and that updating the preference value VP on the keyword KW is not necessary. Then, the control section 2 moves to the next step SP10.

In step SP10, the control section 2 determines whether the reception of the television program being currently broadcasted has been stopped for a reason such as for starting playing a recording program or not. If the negative result is obtained, this means that a user is still viewing the television program. Therefore, the control section 2 returns to step SP1 again to repeat the processing including a series of the processing steps on the next keyword.

On the other hand, if the positive result is obtained in step SP10, the control section 2 moves to the next step SP1 where the preference information updating processing routine RT1 ends.

[3-2] Program Searching Processing

The control section 2 of the program recording/playing apparatus 1 starts the program searching processing subroutine SRT2 shown in FIG. 9 if the positive result is obtained in step SP7 of the preference information updating processing routine RT1 (FIG. 8) and moves to step SP21.

In step SP21, the control section 2 searches a television program including a keyword KW from the EPG database DBE stored in the hard disk drive 21 through the search processing section 25 and moves to the next step SP22.

In step SP22, the control section 2 displays the program name of the hit television program on the display screen P2 (FIG. 6) as a string TL and then moves to the next step SP23 where the program search processing subroutine SRT2 ends. Then, the control section 2 returns to the first preference information update processing routine RT1 (FIG. 8).

[4] Operations and Effects

In the configurations above, the control section 2 of the program recording/playing apparatus 1 causes the keyword extracting section 23 to extract a keyword KW from a television program being currently broadcasted, prompts a user to evaluate it by displaying a keyword extraction icon IC on the display screen P1 (FIG. 4), causes the preference information managing section 24 to increase/decrease the preference value VP corresponding to the keyword KW and update the preference information database DBP.

In response to the reception of an instruction to search a television program from a user, the control section 2 of the program recording/playing apparatus 1 causes the search processing section 25 to search from the EPG database DBE a television program including the keyword KW extracted immediately before by the keyword extracting section 23 and causes to display the program name of the hit television program on the display screen P2 as a program name string TL (FIG. 6).

Thus, the program recording/playing apparatus 1 can increase/decrease the preference value VP corresponding to the keyword KW highly related to one scene of the television program based on user's evaluation on the scene. Therefore, user's detail preference on scenes of the television program can be highly reflected on the preference information database DBP through the keyword KW.

Since the program recording/playing apparatus 1 here prompts a user to evaluate each keyword KW every time an effective keyword KW is obtained, user's preference can be obtained in detail on each scene of a television program. For example, comparing with the case where evaluation is performed on each television program, the degree of reflection of user's preference can be increased in the preference information database DBP.

Since the program recording/playing apparatus 1 extracts a keyword KW based on closed caption information TX, many keywords KW much highly related to one scene of a television program can be extracted. Therefore, user's preference can be expressed in many sides by updating the preference information database DBP by using the many keywords KW.

In response to the reception of the instruction to search a television program during the display of the keyword extraction icon IC, the program recording/playing apparatus 1 searches and displays the television program by using the keyword KW evaluated immediately before. Thus, the evaluation can be performed after more specifically recognizing what kind of television program is to be searched. Therefore, in addition to user's simple preference, user's intention can be reflected on the preference information database DBP.

Furthermore, since the program recording/playing apparatus 1 prompts a user to evaluate the keyword KW matching with a keyword criterion CK by displaying the keyword extraction icon IC on the display screen P1 when the keyword KW can be extracted. Therefore, the possibility for discomforting a user is extremely low by eliminating the necessity of temporarily stopping viewing a television program.

Since the program recording/playing apparatus 1 allows a user to evaluate by performing a simple operation such as pressing either "Interested" or "Not-Interested" button on the remote controller 7, user's straight-forward evaluation on a television program being currently viewed can be expected without causing the user any trouble.

In the configuration above, the program recording/playing apparatus 1 extracts a keyword from a television program being currently broadcasted, prompts a user to evaluate at that point, and increases or decrease the preference value VP corresponding to the keywords based on the evaluation result. Thus, the preference value VP on the keyword KW highly related to a scene of the television program can be increased or decreased based on the user's evaluation on the scene. Therefore, user's preference can be reflected on the preference information database DBP with high precision.

[5] Other Embodiments

Having described the case where the keyword extraction icon IC is displayed on the display screen P1 when a keyword KW matching with a keyword criterion CK is extracted according to the embodiment above, the invention is not limited thereto. For example, a user may be prompted to evaluate by presenting the fact that a keyword KW has been extracted by various means such as displaying a message prompting evaluation or an extracted keyword KW in text or playing a predetermined sound or voice, for example.

In particular, in a case where a keyword KW is to be displayed in text and has been evaluated in the past and therefore has the preference value VP, the display of the keyword KW along with the preference value VP may be referred for new evaluation.

Having described the case where either "Interested" or "Not-Interested" button is pressed on the remote controller 7 for prompting a user to evaluate in the embodiment above, the invention is not limited thereto. The evaluation may be performed through other various methods including displaying a slide bar in the lower right part of the display screen P1 (FIG. 4) for example, inputting an evaluation value by sliding the slide bar in a stepwise manner or serially through a cursor button (not shown) on the remote controller 7 or directly displaying the numerical value of the preference value VP and increasing or decreasing the numerical value through a cursor button, for example. Furthermore, multiple methods may be configured to be switchable, and a user may select the method to use.

In this case, the range of the increase/decrease of the preference value VP may be determined in accordance with the state of the slide bar or the increased or decreased value. Furthermore, in the case where evaluation is performed by pressing either "Interested" or "Not-Interested" button, the preference value VP may be increased or decreased by multiplying a predetermined coefficient thereby or using a predetermined function instead of adding or subtracting a predetermined value of 0.1 to or from the preference value VP.

User's behavior such as nodding or user's action such as an uneasy behavior may be recognized by imaging the user with an image recognizing device 50 (FIG. 1) having imaging means such as a camera and performing image recognition processing on the imaged image. Then, the evaluation on a television program by the user may be estimated based thereon. Alternatively, a detail of speaking such as laughter may be recognized by collecting voice given by a user through a voice recognizing device 60 (FIG. 1) having voice collecting means such as a microphone and performing voice recognition processing on the collected voice. Then, user's evaluation on the television program may be estimated based thereon.

Having described the case where the preference value VP on a registered keyword KW if any is loaded (steps SP3 to SP5) in the preference information updating processing routine RT1 in the embodiment above, the invention is not limited thereto. For example, the preference value VP may be determined based on new evaluation only on a registered keyword KW if any.

Having described the case where a television program is searched in accordance with an operation by a user (step SP7 and program searching processing subroutine SRT2) in the preference information updating processing routine RT1 (FIG. 8) in the embodiment above, the invention is not limited thereto. A television program may be searched by no criteria, or no television program may be searched when a keyword KW is extracted.

Having described the case where the preference value VP is not changed if a user does not respond upon display of the keyword extraction icon IC on the display screen P1 in the embodiment above, the invention is not limited thereto. For example, the fact that a user has not responded may be determined as the negative evaluation, and the preference value VP on the keyword KW extracted at that time may be decreased, for example.

Having described the case where a special search result display screen P3 (FIG. 7) is configured to display entirely as a search result of the search of a television program by using multiple keywords KW in the embodiment above, the invention is not limited thereto. For example, the search result may be presented by various display methods by displaying video images of a television program over a translucent background of the search result display screen P3 or displaying the search result display screen P3 over a partial area of video images of a television program, for example.

Having described the case where, when a television program being currently broadcasted is received, a keyword KW is extracted, and a user is prompted to evaluate it in the embodiment above, the invention is not limited thereto. When a recorded program is played, a keyword KW may be extracted from closed caption information TX and a user may be prompted to evaluate it. Alternatively, when various video contents such as video contents stored in a package medium such as a DVD (Digital Versatile Disc) and streaming-distributed video contents are played, a keyword KW may be extracted from closed caption information TX or text information, for example, and a user may be prompted to evaluate it.

Having described the case where a keyword KW is extracted from the closed caption information TX of a television program in the embodiment above, the invention is not limited thereto. A keyword KW may be extracted from various strings corresponding to one scene of video contents, such as text data of a closed caption or supplementary information, for example.

Having described the case where a television program is searched by the search processing section 25 (FIG. 1) from television programs to be broadcasted in the future in the embodiment above, the invention is not limited thereto. For example, a recorded program including a keyword KW may be selected from recorded programs, or video contents including a keyword KW may be searched from video contents stored in a video server (not shown) in a household or on a network. Furthermore, a television program to be broadcasted in the future, a recorded program or video contents may be searched evenly. Text information to which a commentary or explanation is added, for example, may be used, without limiting to the title of a television program or video contents to be searched.

Having described the case where each of multiple keywords KW is searched to search a television program by using the multiple keywords KW, the invention is not limited thereto. For example, a television program may be searched by using an AND or OR of multiple keywords KW, for example.

Having described the case where the preference information database DBP is updated only when a keyword KW is extracted in the embodiment above, the invention is not limited thereto. When a recorded program is deleted from the hard disk drive 21, for example, the preference value VP relating to a keyword KW included in the closed caption information TX of the recorded program may be decreased. Alternatively, when a predetermined period of time (such as one month) has passed from the registration of a new keyword KW with the preference information database DBP, the preference value VP of the keyword KW may be decreased by a predetermined amount. The preference information database DBP may be updated at other various times.

Having described the case where the invention is applied to the program recording/playing apparatus that records a television program in the embodiment above, the invention is not limited thereto. The invention may be applicable to television equipment having a receiving function for television broadcasting and having display means such as a liquid crystal panel, that is, a television receiver such as a set-top box or a contents player that connects to a streaming distribution server or a video server for video contents and receives/plays video contents. In this case, a predetermined contents playing program may be executed in an information processing apparatus such as a personal computer and a cellular phone.

Having described the case where programs such as the preference information updating program and program searching program are stored in the ROM 4 in the embodiment above, the invention is not limited thereto. A program may be loaded from a removable storage medium such as a CD-ROM (Compact Disc-Read Only Memory) medium and a "MEMORY STICK (Registered Trademark of Sony Corporation)", not shown, and be directly executed or may be installed and executed in the RAM 5 or a flash memory (not shown). Alternatively, a program to be executed may be obtained through a USB interface (not shown), a radio LAN interface based on IEEE802.11a/b/g, for example or television broadcast waves, for example.

Having described the case where the program recording/playing apparatus 1 as a preference extracting apparatus includes the closed caption decoder 22 as a text information obtaining section, the keyword extracting section 23 as a keyword extracting section, the video signal processing section 15 as a presenting section, the preference information managing section 24 as a preference value defining section, and the hard disk drive 21 as a storage section in the embodiment above, the invention is not limited thereto. The preference extracting apparatus may include a text information obtaining section, a keyword extracting section, a presenting section, a preference value defining section and a storage section, which may have other various circuit constructions.

The invention is applicable to various electronic machines that play video contents.

It should be understood by those skilled in the art that various modifications, combinations, sub-combinations and alterations may occur depending on design requirements and other factors insofar as they are within the scope of the appended claims or the equivalents thereof.

What is claimed is:

1. A preference extracting apparatus comprising:
   a display that displays video programs;
   a text information obtaining section that obtains text information that accompanies video content of a scene being currently displayed, said text information having strings of text;
   a morpheme analyzer for producing morphemes from said text information and successively supplying each morpheme to be analyzed for keywords;
   a keyword extracting section that extracts from the morphemes keywords associated with the scene being displayed for measuring user's preference based on the morphemes;
   a presenting section that causes said display to display to the user a display indication representing that the keywords associated with the displayed scene have been extracted;
   a preference value defining section that defines a preference value of the user to the scene being displayed in accordance with a response by the user to the display indication and indicating the degree of preference by the user to the extracted keywords associated with said displayed scene such that the preference value of the user is increased or decreased as a function of the user's response; and
   a storage section that establishes correspondence between each keyword and its associated preference value and stores an initial preference value of an extracted keyword to which said user has not yet responded, and said storage section storing the preference values of said keywords to which said user has responded as the user's preference information in predetermined storage means.

2. The preference extracting apparatus according to claim 1, wherein the text information obtaining section obtains the text information from closed caption information given to the video contents.

3. The preference extracting apparatus according to claim 1, wherein said successive morphemes are supplementary information that supplements the video contents for each scene.

4. The preference extracting apparatus according to claim 1, wherein the preference value defining section defines a preference value resulting from the conversion of the user's preference into a number regarding the extracted keyword.

5. The preference extracting apparatus according to claim 1, wherein the preference value defining section defines the preference value in accordance with the user's operation on a predetermined operating section.

6. The preference extracting apparatus according to claim 1, wherein the preference value defining section has:
   an imaging section that images the user; and
   a behavior recognizing section that recognizes a behavior by the user based on the imaging result by the imaging section; and
   defines the preference value in accordance with the user's behavior recognized by the behavior recognizing section.

7. The preference extracting apparatus according to claim 1, wherein the preference value defining section has:
   a sound collecting section that collects surrounding voice; and
   a voice recognizing section that recognizes voice given by the user based on the sound collection result by the sound collecting section; and
   defines the preference value in accordance with the voice of the user, which is recognized by the voice recognizing section.

8. The preference extracting apparatus according to claim 1, wherein the presenting section causes the display to display a predetermined mark on a part or all of the display screen displaying a video image of the video contents.

9. The preference extracting apparatus according to claim 1, wherein the presenting section causes the display to display the keyword on a part or all of the display screen displaying a video image of the video contents.

10. The preference extracting apparatus according to claim 1, further comprising:
    searching means for searching the video contents matching with the preference information from a plurality of the video contents,
    wherein the presenting section displays the keyword on a part or all of the display screen displaying a video image of the video contents and presents a search result based on the keyword by the searching means.

11. The preference extracting apparatus according to claim 10, wherein the presenting section translucently displays the search result based on the keyword by the searching means.

12. A preference extracting method performed by a processor comprising the steps of:
    obtaining text information that accompanies video content of a scene being currently displayed on a display unit, said text information having strings of text;
    producing morphemes from said text information, wherein each morpheme is a string of text of minimal length;
    analyzing successive morphemes to determine if a morpheme contains a keyword;

extracting keywords associated with the scene being displayed from the morphemes for measuring user's preference based on the text information;

causing the display unit to display to the user a display indication representing that the keywords associated with the displayed scene have been extracted; and defining a preference value of the user to the scene being displayed in accordance with a response by the user to the display indication and indicating the degree of preference by the user to the extracted keywords associated with said displayed scene such that the preference value of the user is increased or decreased as a function of the user's response, establishing correspondence between each keyword and its associated preference value, storing an initial preference value of an extracted keyword to which said uses has not yet responded and storing the preference values of said keywords to which said user has responded as the user's preference information in predetermined storage means.

13. A non-transitory computer readable medium on which is stored a preference extracting program causing a computer to perform the steps of:

obtaining text information that accompanies video content of a scene being currently displayed on a display unit, said text information having strings of text;

producing morphemes from said text information, wherein each morpheme is a string of text of minimal length;

extracting keywords associated with the scene being displayed from the morphemes for measuring user's preference based on the text information;

causing the display unit to display to the user a display indication representing that the keywords associated with the displayed scene have been extracted;

defining a preference value of the user to the scene being displayed in accordance with a response by the user to the display indication and indicating the degree of preference by the user to the extracted keywords associated with said displayed scene such that the preference value of the user is increased or decreased as a function of the user's response, establishing correspondence between each keyword and its associated preference value, storing an initial preference value of an extracted keyword to which said user has not yet responded and storing the preference values of said keywords to which said user has responded as the user's preference information in predetermined storage means.

* * * * *